(12) United States Patent
Anderson et al.

(10) Patent No.: US 12,719,839 B2
(45) Date of Patent: Aug. 25, 2026

(54) NETWORK TELEMETRY WITH BYTE DISTRIBUTION AND CRYPTOGRAPHIC PROTOCOL DATA ELEMENTS

(71) Applicant: Cisco Technology, Inc., San Jose, CA (US)

(72) Inventors: Blake Harrell Anderson, Chapel Hill, NC (US); David Arthur McGrew, Poolesville, MD (US); Alison Kendler, Allston, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/368,969

(22) Filed: Sep. 15, 2023

(65) Prior Publication Data

US 2024/0007774 A1 Jan. 4, 2024

Related U.S. Application Data

(60) Division of application No. 17/154,053, filed on Jan. 21, 2021, now Pat. No. 11,800,260, which is a
(Continued)

(51) Int. Cl.
*H04L 9/32* (2006.01)
*H04L 9/00* (2022.01)
(Continued)

(52) U.S. Cl.
CPC ........ *H04L 63/0428* (2013.01); *H04L 63/102* (2013.01); *H04L 63/1441* (2013.01);
(Continued)

(58) Field of Classification Search
CPC ......................... H04L 63/0468; H04L 63/102; H04L 64/1441
(Continued)

(56) References Cited

U.S. PATENT DOCUMENTS 7,683,773 B1 * 3/2010 Goodall .............. G06Q 10/087 705/13
7,778,194 B1 8/2010 Yung
(Continued)

FOREIGN PATENT DOCUMENTS

CN 1294723 C * 1/2007

OTHER PUBLICATIONS

Lim H., et al., "Malware Classification Method Based on Sequence of Traffic Flow," Proceedings of the 1st International Conference on Information Systems Security and Privacy, (ICISSP-2015), 2015, pp. 230-237, DOI: 10.5220/0005235002300237.

*Primary Examiner* — Haresh N Patel
(74) *Attorney, Agent, or Firm* — Lee & Hayes, P.C.

(57) ABSTRACT

In one embodiment, a method includes receiving a traffic flow including a plurality of packets encrypted using a cryptographic protocol, determining cryptographic protocol data of the traffic flow, and transmitting telemetry data of the traffic flow including the cryptographic protocol data. In another embodiment, a method includes receiving telemetry data of a traffic flow including a plurality of packets encrypted using a cryptographic protocol, the telemetry data including cryptographic protocol data of the traffic flow, classifying the traffic flow based on the cryptographic protocol data using a machine learning classifier; and taking a remedial action with respect to the traffic flow based on the classification of the traffic flow.

20 Claims, 5 Drawing Sheets

Related U.S. Application Data continuation of application No. 16/436,489, filed on Jun. 10, 2019, now Pat. No. 10,932,017, which is a continuation of application No. 15/083,586, filed on Mar. 29, 2016, now Pat. No. 10,362,373.

(60) Provisional application No. 62/275,917, filed on Jan. 7, 2016, provisional application No. 62/275,925, filed on Jan. 7, 2016.

(51) Int. Cl.
*H04L 9/40* (2022.01)
*H04L 9/30* (2006.01)
*H04Q 9/00* (2006.01)
*H04Q 9/02* (2006.01)

(52) U.S. Cl.
CPC ........ *H04L 9/3066* (2013.01); *H04L 63/0823* (2013.01); *H04L 63/166* (2013.01); *H04Q 9/00* (2013.01); *H04Q 9/02* (2013.01); *H04Q 2209/30* (2013.01)

(58) Field of Classification Search
USPC .......................................................... 713/168
See application file for complete search history.

(56) References Cited

U.S. PATENT DOCUMENTS 7,843,823 B2 11/2010 Lev-Ran
8,418,249 B1 4/2013 Nucci
8,539,221 B2 9/2013 Tremblay et al.
8,682,812 B1 3/2014 Ranjan
9,094,288 B1 7/2015 Nucci et al.
9,191,400 B1 11/2015 Ptasinski
9,231,965 B1 1/2016 Vasseur et al.
9,432,389 B1* 8/2016 Khalid ................ H04L 63/1425
9,483,742 B1* 11/2016 Ahmed ............... H04L 63/1441
9,712,621 B1 7/2017 Bowen
9,813,310 B1 11/2017 Sieracki
10,075,454 B1 9/2018 Parikh et al.
10,320,813 B1* 6/2019 Ahmed ............... H04L 63/1416
10,362,373 B2 7/2019 Anderson et al.
11,272,268 B2 3/2022 Anderson et al.
2008/0080558 A1 4/2008 Wang
2009/0169001 A1 7/2009 Tighe
2010/0241872 A1 9/2010 Pinder
2010/0287383 A1 11/2010 Conte
2011/0032942 A1* 2/2011 Matthews ........... H04L 12/5691 370/392
2012/0039337 A1 2/2012 Jackowski et al.
2012/0260330 A1 10/2012 Zlatarev
2013/0033994 A1 2/2013 Parekh
2013/0132854 A1* 5/2013 Raleigh ................. G06F 3/0482 715/738
2013/0198152 A1 8/2013 McGhee
2013/0204997 A1 8/2013 Eggleston
2013/0232305 A1 9/2013 Cuthbert, II
2013/0329886 A1 12/2013 Kipnis
2014/0059200 A1* 2/2014 Nguyen ................ H04L 43/026 709/224
2014/0059216 A1 2/2014 Jerrim
2014/0082204 A1* 3/2014 Shankar ................ H04L 63/166 709/227
2014/0098669 A1* 4/2014 Garg ....................... H04L 45/38 370/235
2014/0328348 A1 11/2014 De Santis
2014/0334321 A1 11/2014 Sanivsky
2014/0351582 A1 11/2014 Barletta
2015/0052601 A1* 2/2015 White ................. H04L 63/1416 726/13
2015/0200860 A1* 7/2015 Kampeas ................ H04L 43/08 370/235
2015/0281028 A1* 10/2015 Akhter ................ H04L 43/0858 370/252
2015/0319076 A1 11/2015 Vasseur
2015/0319077 A1 11/2015 Vasseur
2015/0370723 A1 12/2015 Nambiar
2016/0021126 A1 1/2016 Vasseur et al.
2016/0028750 A1 1/2016 Di Pietro et al.
2016/0028751 A1 1/2016 Cruz Mota et al.
2016/0028752 A1 1/2016 Di Pietro et al.
2016/0028753 A1 1/2016 Di Pietro et al.
2016/0028754 A1 1/2016 Cruz Mota et al.
2016/0028762 A1 1/2016 Di Pietro et al.
2016/0028763 A1 1/2016 Cruz Mota et al.
2016/0028764 A1 1/2016 Vasseur et al.
2016/0080230 A1 3/2016 Anand et al.
2016/0080417 A1 3/2016 Thomas
2016/0173354 A1 6/2016 Zhao
2016/0366155 A1 12/2016 El-Moussa
2017/0013000 A1 1/2017 El-Moussa
2017/0061129 A1* 3/2017 Bektchiev ................. H04L 9/00
2017/0126475 A1 5/2017 Mahkonen
2017/0223032 A1 8/2017 El-Moussa
2018/0115566 A1 4/2018 Azvine et al.
2018/0124085 A1 5/2018 Frayman et al.
2018/0152467 A1 5/2018 Anderson et al.
2018/0307833 A1 10/2018 Noeth et al.
2021/0126858 A1* 4/2021 Bisti ..................... H04W 40/20

* cited by examiner

NETWORK TELEMETRY WITH BYTE DISTRIBUTION AND CRYPTOGRAPHIC PROTOCOL DATA ELEMENTS

CROSS-REFERENCES TO RELATED APPLICATIONS

The present application is a division of U.S. patent application Ser. No. 17/154,053, now U.S. Pat. No. 11,800,260, filed on Jan. 21, 2021, which is a continuation of U.S. patent application Ser. No. 16/436,489, now U.S. Pat. No. 10,932,017, filed on Jun. 10, 2019, and U.S. patent application Ser. No. 15/083,586, now U.S. Pat. No. 10,362,373, filed on Mar. 29, 2016, all entitled Network Telemetry with Byte Distribution and Cryptographic Protocol Data Elements, by Anderson et al., and claims priority to U.S. Provisional Patent App. Nos. 62/275,917 and 62/275,925, both filed Jan. 7, 2016, the entire contents of which are incorporated herein by reference.

TECHNICAL FIELD

The present disclosure relates generally to network telemetry, and in particular, to systems, methods and apparatuses enabling network telemetry data including an indication of the distribution of byte values within a flow.

BACKGROUND

The ongoing development, maintenance and expansion of networking systems often involve the exchange of encrypted data between devices on a network. Encrypted network traffic poses challenges with respect to visibility and threat detection.

To that end, such systems can employ network telemetry systems that monitor traffic flowing through the network. Such network telemetry systems can collect, analyze, and store a variety of different types of information concerning traffic traversing the network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
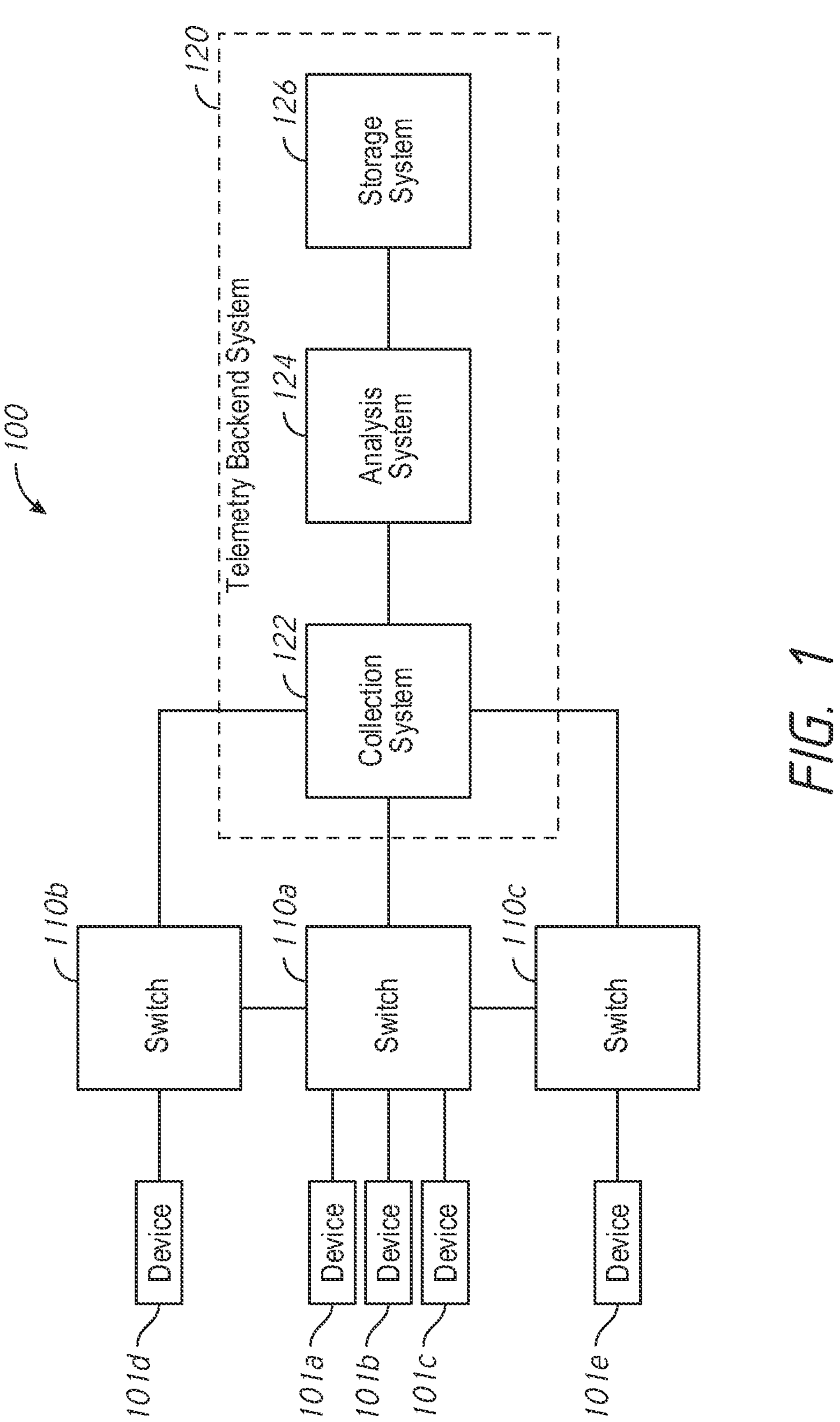
FIG. 1 is a block diagram of a network including a telemetry backend system in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for transmitting telemetry data including a byte value distribution metric and classifying flows based on telemetry data including a byte value distribution metric. For example, in some implementations, a method includes receiving a flow including a plurality of bytes, each byte having one of a plurality of byte values, determining a byte value distribution metric based on a number of instances of each of the plurality of byte values in the flow, and transmitting telemetry data regarding the flow, the telemetry data including the byte value distribution metric.

As another example, in some implementations, a method includes receiving telemetry data regarding a flow, the telemetry data including a byte value distribution metric, and classifying the flow based on the byte value distribution metric.

As another example, in some implementations, a method includes receiving a flow including a plurality of packets, determining cryptographic protocol data regarding the flow, and transmitting telemetry data regarding the flow, the telemetry data including the cryptographic protocol date.

As another example, in some implementations, a method includes receiving telemetry data regarding a flow, the telemetry data including cryptographic protocol data, and classifying the flow based on the cryptographic protocol data.

EXAMPLE EMBODIMENTS

FIG. 1 is a block diagram of a network 100 including a telemetry backend system 120. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network 100 includes a number of devices 101*a*-101*e* that can communicate with each other via one or more switches 110*a*-110*c*. The network 100 further includes a telemetry backend system 120 that includes a collection system 122 that receives network telemetry data from the switches 110*a*-110*c*, an analysis system 124 that processes and analyzes the network telemetry data, and a storage system 126 that stores the network telemetry data and/or the results of analyzing the network telemetry data.

A number of flows can traverse the network 100 from a source device to a destination device (e.g, from one device 101*a*-101*e* to another device 101*a*-101*e*). A flow includes a number of data packets sharing one or more common characteristics, e.g., a source IP address and a destination IP address. Each data packet includes a plurality of bytes and each byte has a byte value from 0 to 255 (e.g., representing 8 bits of data). In various implementations, a flow can be a unidirectional flow (e.g., from one device to another) or a bidirectional flow (e.g., between two devices).

Each switch 110*a*-110*c* is configured to route the packets of the flow from the source device to the destination device. Each switch 110*a*-110*c* is further configured to monitor the flow (e.g., inspect the packets of the flow) to determine telemetry data regarding the flow. For example, a switch 110*a* can determine telemetry data regarding a flow that includes a source IP address of the flow, a destination IP address of the flow, a start time of the flow, a stop time of the flow, a protocol associated with the flow, a number of packets of the flow, a number of bytes of the flow, and/or a number of bytes of each packet (or at least a subset of the packets, such as the first 50 packets). The telemetry data can include other types of information regarding the flow as described further below.

Thus, each switch 110*a*-110*c* is part of a network telemetry frontend system that observes the data transiting the network 100 and reports information regarding that data so that it can be collected, analyzed, and stored (e.g., by the network telemetry backend system 120). The network telemetry frontend system can further include other observation points (e.g., endpoints, Netflow Generating Appliances, or other devices). In some implementations, network telemetry is implemented with the IPFIX (Internet Protocol Flow Information Export) or the Netflow protocol.

In some implementations described herein, the telemetry data regarding flows transmitted by the switches 110*a*-110*c* includes a byte value distribution metric. As mentioned above, each packet of a flow includes a plurality of bytes. Thus, the flow includes a plurality of bytes. As also mentioned above, each byte has a byte value from 0 to 255. Thus, each byte has one of a plurality of byte values. When inspecting a flow to generate telemetry data, each switch 110*a*-110*c* can determine the byte value of each byte and maintain a count of the number of instances of each byte value in the flow. Thus, each switch 110*a*-110*c* can determine, for each byte value, a number of instances of the byte value in the plurality of bytes of the flow. Thus, the switch 110*a*-110*c* can generate a 256 element array (or table) that indicates the number of times each byte value appears in a flow. The switch 110*a*-110*c* can generate one or more byte value distribution metrics based on the number of instances of the byte values and transmit telemetry data regarding the flow to the telemetry backend system 120, the telemetry data including the byte value distribution metrics.

The byte value distribution metrics can take a number of different forms. In some implementations, the byte value distribution metric is a 256-element array that includes the number of instances of each of the byte values. In some implementations, the array is normalized such that the byte value distribution metric is a byte value probability distribution. In some implementations, the byte value distribution metric includes a byte value entropy metric generated based on the number of instances of the byte values. For example, the byte value entropy metric can include Shannon's entropy of the byte value probability distribution. Shannon's entropy is defined as—

$$\sum_{i=0}^{255} p_i$$

log $p_i$, where $p_i$ is the probability of a byte having a byte value of i. As another example, the byte value entropy metric can include Renyi entropy of order two, which is sometimes referred to as collision entropy.

In some implementations, the byte value distribution metric is a less-than-256-element array that includes the number of instances of any byte value of a set of byte values. In some embodiments, the sets of byte values are sequential, e.g., 0-3, 4-7, 8-11, etc. In some embodiments, the sets of byte values are non-sequential, e.g, [0, 1, 4, 8]; [2, 5, 10, 12]; [3, 6, 7, 11]; etc. Thus, in some implementations, the byte value distribution metric includes a plurality of values, each of the values being indicative of the number of instances of any of two or more byte values in the flow (or the sum of the number of instances of two or more byte values in the flow).

In some implementations, the byte value distribution metric is determined on a per-flow basis. In some implementations, the byte value distribution metric is determined on a per-packet basis. Thus, in some implementations, the byte value distribution metric includes a plurality of metrics (each corresponding to one of a plurality of packets of the flow), each of the metrics being a byte value distribution metric based on the number of instances of each byte value in a respective packet.

Encryption in network traffic, and in data such as files that transit networks, is rapidly increasing. This poses major challenges with respect to visibility and threat detection because traditional technologies, such as deep packet inspection, cannot be applied to encrypted traffic. In terms of visibility, being able to detect encrypted traffic over unconventional ports, such as DNS (Domain Name System), could indicate out-of-policy tunnels or data exfiltration. More specifically, the detection of cryptographic protocols independent of the ports being utilized gives valuable knowledge to network administrators. In terms of threat detection, characterizing encrypted traffic as malicious has obvious benefits. Administrators may also want to know when encrypted files transit the network in non-encrypted protocols such as HTTP, which is another data exfiltration method. It is desirable for network monitoring techniques to detect encrypted data whenever it appears on the network, regardless of where it appears, to give insight into specific aspects of encrypted traffic, such as cryptographic protocol identification, data exfiltration identification, and malware identification.

Including one or more byte value distribution metrics with traditional flow information elements can lead to improved results on a number of problems, including but not limited to malware detection, cryptographic protocol detection, tunnel detection, spoofed traffic detection, application detection, and detection of the encoding used (binary, text, base64, Unicode, etc.)

A general framework for using a byte value distribution metric to solve one of these problems would be to collect, as training flows, positive and negative examples for a problem of interest (for instance, flows that make use of TLS (Transport Layer Security) as positive examples and non-TLS flows as negative examples) and extract the normalized byte value probability distribution and other elements of the training flows. Then, a machine learning classifier (e.g., 11-logistic regression) can be trained on this data. The classifier can then be applied to new telemetry data being exported by the switch 110*a*-110*c* or to data previously collected and stored by the telemetry backend system 120.

Thus, the telemetry backend system 120 can be configured to receive telemetry data regarding a flow, the telemetry data including a byte value distribution metric, and to classify the flow based (at least in part) on the byte value distribution metric. The telemetry backend system 120 can classify the flow using a machine learning classifier as described above. In some embodiments, the telemetry backend system 120 can take further action based on the classification. For example, the telemetry backend system 120 can generate an alert based on a classification of the flow as a malicious flow. As another example, the telemetry backend system 120 can kill the flow based on a classification of the flow as a malicious flow. As another example, the telemetry backend system 120 can restrict a flow based on a classification of the flow as a tunneled flow. As another example, the telemetry backend system can quarantine a device in response to one or more flows classified as malicious coming from that device. As another example, the telemetry backend system can set billing parameters (or take other actions) based on a classification of a flow as a tunneled flow. As another example, the telemetry backend system can initiate a full packet capture for flow classified as malicious.

In various implementations, packets in the flow are encrypted. One method of encryption is TLS (Transport Layer Security). There is a large amount of variety in the implementations and configurable parameters of the TLS standard found even within a single enterprise network. With numerous weaknesses reported for older versions of TLS, specific TLS implementations, and the associated TLS options (e.g. the selected ciphersuite or a specific TLS extension), it can be beneficial to have a stronger understanding of how TLS is being utilized on a network. Additionally, it can be beneficial to be able to detect malware communications and other unauthorized communications, even when it is encrypted.

Figure 2:
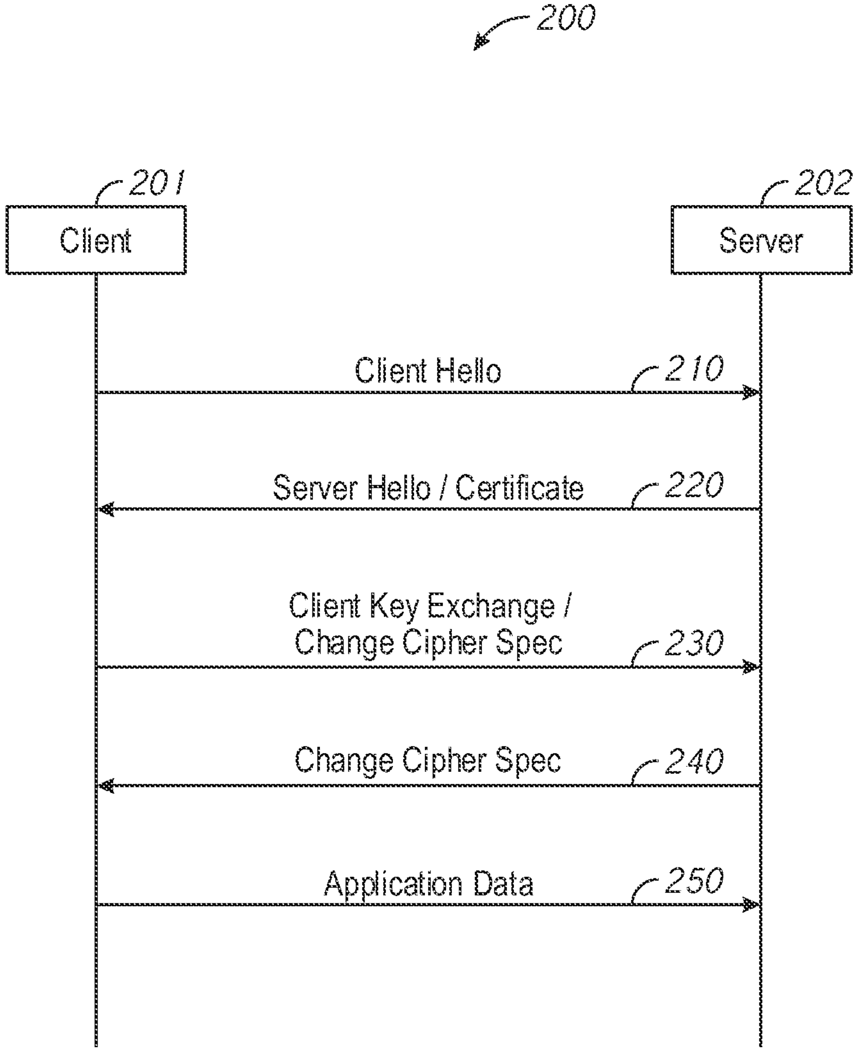
FIG. 2 is a communication diagram showing a data exchange including a handshake procedure to establish an encrypted connection in accordance with some implementations.

In implementations described herein, the telemetry data regarding flows by the switches 110*a*-110*c* includes cryptographic protocol data, which can be unencrypted (e.g., during a handshake procedure) and intercepted by the switches 110*a*-110*c*. In various implementations, the telemetry data includes a byte value distribution metric, cryptographic protocol data, or both. For example, in the context of TLS, the cryptographic protocol data can include:

- TLS major/minor version numbers
- The set of ciphersuites offered by the client
- The ciphersuite selected by the server
- TLS SRLT (Sequence of (TLS) Record Lengths and Times)
- The record type of the records in the SRLT
- The handshake type of the records in the SRLT that are handshake records
- The ExtensionType of any Hello extensions that are present
- The size of important cryptographic elements such as Diffie-Hellman (DH) public keys
- The list of supported elliptic curves and supported points formats FIG. 2 shows a data exchange between a client 201 and a server 202 (e.g., two devices 101*a*-101*e*) including a handshake procedure 210-240 to establish an encrypted connection using a cryptographic protocol and exchange of application data 250 encrypted according to the cryptographic protocol. The handshake procedure begins with a Client Hello message 210, sent from the client 201 to the server 202. Cryptographic protocol data that can be extracted from this message includes a TLS version number, a set of ciphersuites offered by the client 201, and TLS extensions used by the client 201. The handshake procedure continues with a Server Hello message 220 that includes a certificate of the server 202. Cryptographic protocol data that can be extracted from this message includes the ciphersuite selected by the server 202. The handshake procedure continues with a Client Key Exchange message 230 that can include a Change Cipher Spec message. Cryptographic protocol data that can be extracted from this message includes the client key length. The handshake procedure optionally includes a Change Cipher Spec message 240 from the server 202 to the client 201. The handshake procedure 210-240 is followed by the exchange of encrypted application data 250 from which other telemetry data can be derived, such as a sequence of record lengths and times (e.g., a series of values indicative of the size and time of packets in the application data 250).

In the context of SSH (Secure Shell), the cryptographic protocol data can include (as derived from a KEXINIT message), kex_algorithms, server_host_key_algorithms, encryption_algorithms_client_to_server, encryption_algorithms_server_to_client, mac_algorithms_client_to_server, mac_algorithms_server_to_client, compression_algorithms_client_to_server, compression_algorithms_server_to_client, languages_client_to_server, and languages_server_to_client.

The cryptographical protocol data can include data regarding IKE (Internet Key Exchange) or Kerebos or any other cryptographic protocol. In general, the cryptographic protocol data can include a protocol version number, a public key length, a cryptographic algorithm offered or employed, or any other cryptographic protocol information.

Figure 3:
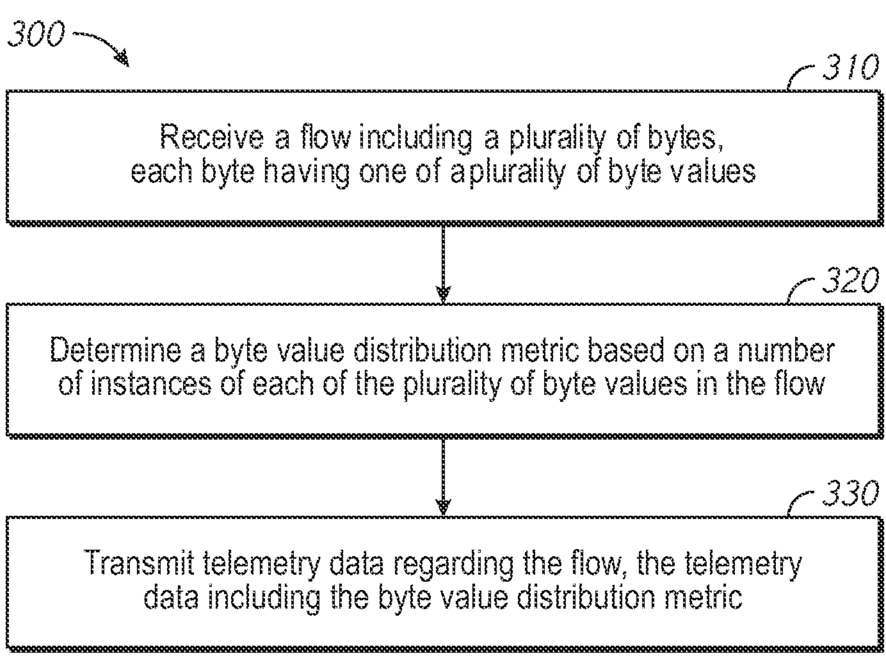
FIG. 3 is a flowchart representation of a method of transmitting telemetry data including a byte value distribution metric in accordance with some implementations.

FIG. 3 is a flowchart representation of a method 300 of transmitting telemetry data including a byte value distribution metric in accordance with some implementations. In some implementations (and as detailed below as an example), the method 300 is performed by a switch, such as the switch 110*a* of FIG. 1. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes receiving a flow, determining a byte value distribution metric based on the number of instances of each byte value in the bytes of the flow, and transmitting telemetry data including the byte value distribution metric. The method 300 can be performed for a number of flows and can be performed by a number of switches, endpoints, or other devices.

The method 300 begins, in block 310, with the switch receiving a flow including a plurality of bytes, each byte having one of a plurality of byte values. For example, a first byte may have a byte value of 0, a second byte may have a byte value of 145, a third byte may have a byte value of 255, and a fourth byte may have byte value of 145 (e.g., the same byte value as the second byte). In some implementations, the flow includes a plurality of packets and each of the plurality of packets includes a subset of the plurality of bytes.

At block 320, the switch determines a byte value distribution metric based on a number of instances of each of the plurality of byte values in the flow. As noted above, the byte value distribution metric can take many forms. In some implementations, the switch maintains a count of each of the plurality of byte values (e.g., 0 to 255) and the switch increments the corresponding count when a byte has the corresponding byte value. Following the example above, the switch would have a count of 1 for the byte value of 0, a count of 0 for byte values between 1 and 143, a count of 2 for the byte value of 145, a count of 0 for byte values between 146 and 254, and a count of 1 for the byte value of 255. In some implementations, the byte value distribution metric is a 256-element array of such counts.

In some implementations, the counts are used to generate more compressed byte value distribution metrics. For example, in some implementations, the counts are used to determine a byte value entropy metric, such as Shannon's entropy of the byte value probability distribution. Following the example above, the switch would normalize the counts by dividing by the number of bytes (e.g., four), to produce byte value probabilities of ¼, ½, and ¼. From these probabilities, Shannon's entropy can be determined as 3/2. In some implementations, the byte value entropy metric can by Renyi entropy of order 2 or another entropy metric.

In some implementations, the byte value distribution metric is a less-than-256-element array that includes the number of instances of any of sets of byte values (e.g., sums of the above-described counts). In some embodiments, the sets of byte values are sequential, e.g., 0-3, 4-7, 8-11, etc. In some embodiments, the sets of byte values are non-sequential, e.g, [0, 1, 4, 8]; [2, 5, 10, 12]; [3, 6, 7, 11]; etc. Thus, in some implementations, the byte value distribution metric includes a plurality of values, each of the values being indicative of the number of instances of any of two or more byte values in the flow.

For example, in some implementations, the sets of byte values are 0 to 127 and 128 to 255. Thus, the byte value distribution metric for the example set of bytes described above would be 1 byte having a byte value between 0 and 127, and 3 bytes having a byte value between 128 and 255.

In some implementations, the counts are normalized by the maximum of the counts and the normalized counts are rounded such that each byte value is associated with either a '1' or a '0' indicating whether the byte value is prominent in the flow or not. Thus, the byte value distribution metric can be a 256-bit array indicative of the prominence of each byte value. In another implementation, the byte value distribution metric can be a set of the most common (or least common) byte values.

Thus, the byte value distribution metric can include multiple values (e.g., in the form of 256-element array or other formats). In some implementations, the byte value distribution metric includes a plurality of metrics, each of the plurality of metrics being a byte value distribution for a respective packet, based on the number of instances of each of the plurality of byte values in the respective packet.

At block 330, the switch transmits telemetry data regarding the flow, the telemetry data including the byte value distribution metric. The telemetry data regarding the flow can further include at least one of a source IP address of the flow, a destination IP address of the flow, a start time of the flow, a stop time of the flow, a protocol associated with the flow, a number of the plurality of bytes, or a number of the plurality of packets. The telemetry data can include other types of information regarding the flow. In some implementations, the telemetry data includes a sequence of packet lengths and times for at least some of the packets.

In some implementations, the telemetry data further includes cryptographic protocol data as described above. For example, the cryptographic protocol data can include at least one of a Transport Layer Security (TLS) version number, one or more ciphersuites offered by a source device, a ciphersuite selected by a destination device, a TLS sequence of record lengths and times, a record type, a handshake type, an extension type, a size of a cryptographic key, or one or more supported elliptical curves and supported point formats.

Figure 4:
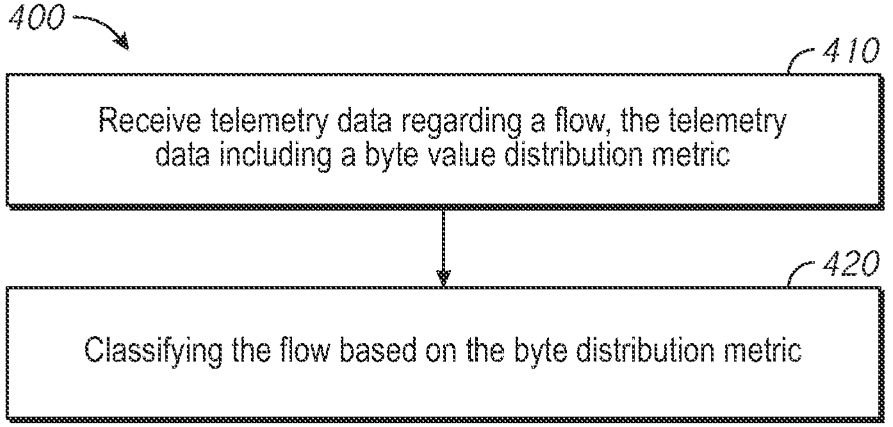
FIG. 4 is a flowchart representation of a method of classifying a flow based on a byte value distribution metric in accordance with some implementations.

FIG. 4 is a flowchart representation of a method 400 of classifying a flow based on a byte value distribution metric in accordance with some implementations. In some implementations (and as detailed below as an example), the method 400 is performed by a telemetry backend system, such as the telemetry backend system 120 of FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes receiving telemetry data regarding a flow including a byte value distribution metric and classifying the flow based on the byte value distribution metric. The method 400 can be performed for a number of flows based on telemetry data received from a number of different switches, endpoints, or other devices.

The method 400 begins, at block 410, with the telemetry backend system receiving telemetry data regarding a flow, the telemetry data including a byte value distribution metric. The telemetry data can further include at least one of source IP address of the flow, a destination IP address of the flow, a start time of the flow, a stop time of the flow, a protocol associated with the flow, a number of bytes in the flow, or a number of packets of the flow. The telemetry data can include other types of information regarding the flow. In some implementations, the telemetry data includes a sequence of packet lengths and times for at least some of the packets of the flow.

In some implementations, the telemetry data further includes cryptographic protocol data. The cryptographic protocol data can include at least one of a TLS version number, one or more ciphersuites offered by a source device, a ciphersuite selected by a destination device, a TLS sequence of record lengths and times, a record type, a handshake type, an extension type, a size of a cryptographic key, or one or more supported elliptical curves and supported point formats.

The byte value distribution metric is based on the number of instances of each of a plurality of byte values in the flow. As described above, the byte value distribution metric can take many forms. In some implementations, the byte value distribution metric includes the number of instances of the byte values, e.g., as a 256-element array. In some implementations, the byte value distribution metric includes a byte entropy metric, such as Shannon's entropy of the byte value probability distribution.

At block 420, the telemetry backend system classifies the flow based on the byte value distribution metric. In some implementations, the telemetry backend system classifies the flow using a machine learning classifier. In some implementations, the telemetry backend system classifies the flow as a benign flow or a malicious flow. In some implementations, the telemetry backend system classifies the flow as a tunneled flow or a non-tunneled flow (e.g., a direct flow). In some implementations, the telemetry backend system classifies the flow as a TLS flow or a non-TLS flow.

As noted above, in some implementations, the telemetry data includes cryptographic protocol data. Thus, in some implementations, classifying the flow is further based on the cryptographic protocol data.

The method 400 can further include actions taken in response to and/or based on the classification. In some implementations, the telemetry backend system generates an alert based on the classification or kills the flow based on the classification. For example, the telemetry backend system can kill the flow based on a classification of the flow as a malicious flow. As another example, the telemetry backend system can quarantine a device in response to one or more flows classified as malicious coming from that device. As another example, the telemetry backend system can set billing parameters (or take other actions) based on a classification of a flow as a tunneled flow.

Figure 5:
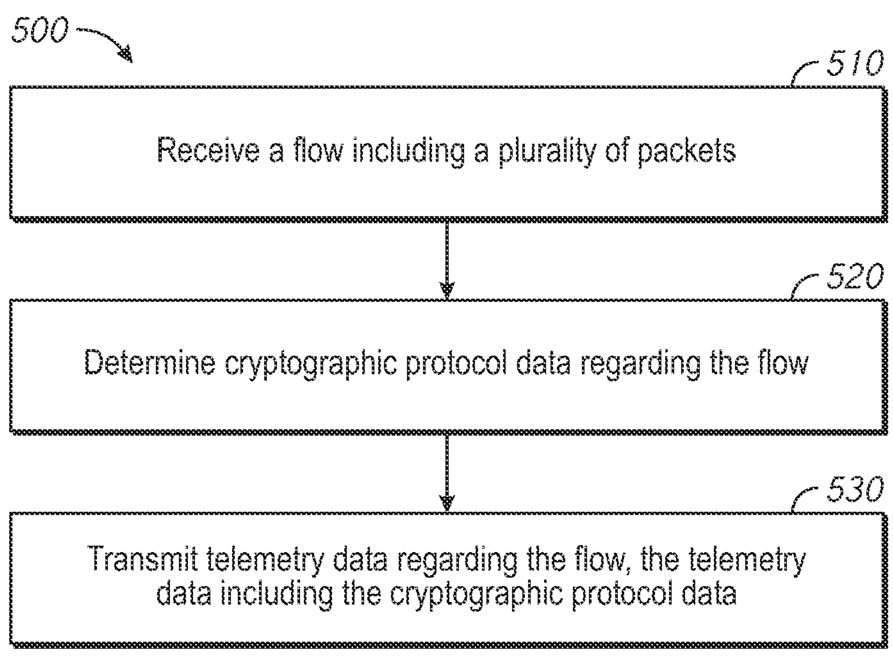
FIG. 5 is a flowchart representation of a method of transmitting telemetry data including cryptographic protocol data in accordance with some implementations.

FIG. 5 is a flowchart representation of a method of transmitting telemetry data including cryptographic protocol data in accordance with some implementations. In some implementations (and as detailed below as an example), the method 500 is performed by a switch, such as the switch 110*a* of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes receiving a flow, determining cryptographic protocol data regarding the flow, and transmitting telemetry data including the cryptographic protocol data. The method 500 can be performed for a number of flows and can be performed by a number of switches, endpoints, or other devices.

The method 500 begins, in block 510, with the switch receiving a flow including a plurality of packets. Some of the packets can be encrypted using a cryptographic protocol. To that end, some of the packets (e.g., packets associated with a handshake procedure) can be unencrypted and can include information to establish an encrypted connection using the cryptographic protocol.

At block 520, the switch determines cryptographic protocol data regarding the flow. Various cryptographic protocol data are described above. For example, the cryptographic protocol data can include data includes at least one a TLS version number, one or more ciphersuites offered by a source device, a ciphersuite selected by a destination device, a TLS sequence of record lengths and times, a record type, a handshake type, an extension type, a size of a cryptographic key, or one or more supported elliptical curves and supported point formats. The switch can determine the cryptographic protocol data by inspecting the unencrypted packets.

At block 530, the switch transmits telemetry data regarding the flow, the telemetry data including the cryptographic protocol data. The telemetry data regarding the flow can further include at least one of a source IP address of the flow, a destination IP address of the flow, a start time of the flow, a stop time of the flow, a protocol associated with the flow, a number of the plurality of bytes, or a number of the plurality of packets. The telemetry data can include other types of information regarding the flow. In some implementations, the telemetry data includes a sequence of packet lengths and times (SRLT) for at least some of the packets. In some implementations, the telemetry data includes a byte value distribution metric, as described above.

Figure 6:
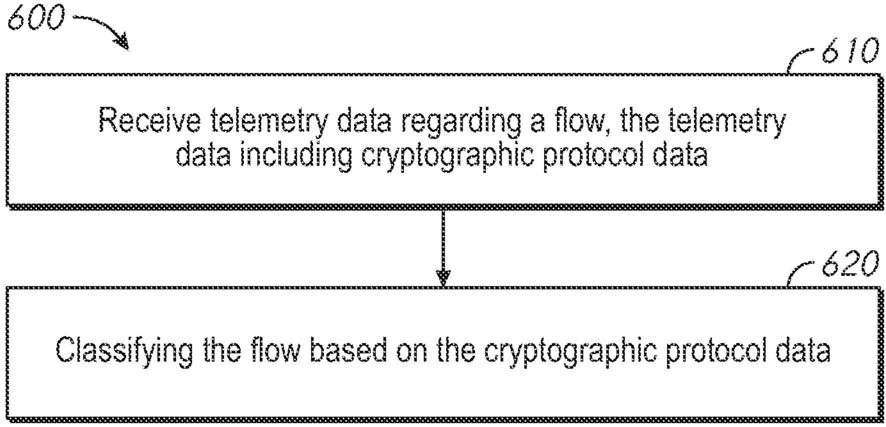
FIG. 6 is a flowchart representation of a method of classifying a flow based on cryptographic protocol data in accordance with some implementations.

FIG. 6 is a flowchart representation of a method of classifying a flow based on cryptographic protocol data in accordance with some implementations. In some implementations (and as detailed below as an example), the method 600 is performed by a telemetry backend system, such as the telemetry backend system 120 of FIG. 1. In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, the method 600 includes receiving telemetry data regarding a flow including cryptographic protocol data and classifying the flow based on the cryptographic protocol data. The method 600 can be performed for a number of flows based on telemetry data received from a number of different switches, endpoints, or other devices.

The method 600 begins, at block 610, with the telemetry backend system receiving telemetry data regarding a flow, the telemetry data including cryptographic protocol data. The telemetry data can further include at least one of source IP address of the flow, a destination IP address of the flow, a start time of the flow, a stop time of the flow, a protocol associated with the flow, a number of bytes in the flow, or a number of packets of the flow. The telemetry data can include other types of information regarding the flow. In some implementations, the telemetry data includes a sequence of packet lengths and times (SRLT) for at least some of the packets of the flow. In some implementations, the telemetry data includes a byte value distribution metric.

At block 620, the telemetry backend system classifies the flow based on the cryptographic protocol data. In some implementations, the telemetry backend system classifies the flow using a machine learning classifier. In some implementations, the telemetry backend system classifies the flow as a benign flow or a malicious flow. In some implementations, the telemetry backend system classifies the flow as a tunneled flow or a non-tunneled flow (e.g., a direct flow). In some implementations, the telemetry backend system classifies the flow as a secure flow or an insecure flow.

In some implementations, the telemetry backend system classifies the flow by classifying a source device of the flow. For example, the telemetry backend system can classify the flow as a flow originating from an insecure source device.

In some implementations, classifying the flow includes determining one or more cryptographic libraries of a source device or a destination device of the flow. For example, the telemetry backend system can infer the cryptographic libraries of the source device and/or the end device based on the cryptographic protocol data.

The method 600 can further include actions taken in response to and/or based on the classification. In some implementations, the telemetry backend system generates an alert based on the classification or kills the flow based on the classification. For example, the telemetry backend system can kill the flow based on a classification of the flow as a malicious flow. As another example, the telemetry backend system can quarantine a device in response to one or more flows classified as malicious coming from that device. As another example, the telemetry backend system can initiate an upgrade of a source device based on a classification of a flow as originating from an insecure or vulnerable source device.

Thus, the telemetry backend system can find devices using insecure TLS configurations. This can be accomplished with the collection of TLS-aware telemetry (telemetry including cryptographic protocol data regarding the TLS cryptographic protocol) by looking for devices communicating with outdated versions of TLS or inadequate key sizes and/or devices that offer insecure ciphersuites such as "export" ciphersuites, or those using obsolete algorithms such as MD5 and RC4. This level of inspection does not require any machine learning and can be easily implemented with no "false positives."

TLS implementation (as opposed to TLS configuration) detection is more nuanced. Even if a device is using the latest version of TLS and only offering secure ciphersuites, there can still be vulnerabilities in the actual implementation. The telemetry backend system can receive TLS-specific features, in addition to other telemetry elements, to build a machine learning classifier that is able to determine the actual TLS implementation (e.g. CiscoSSL 4.0). This machine learning classifier can then monitor the live TLS-aware telemetry being collected to detect any vulnerable TLS implementations.

Figure 7:
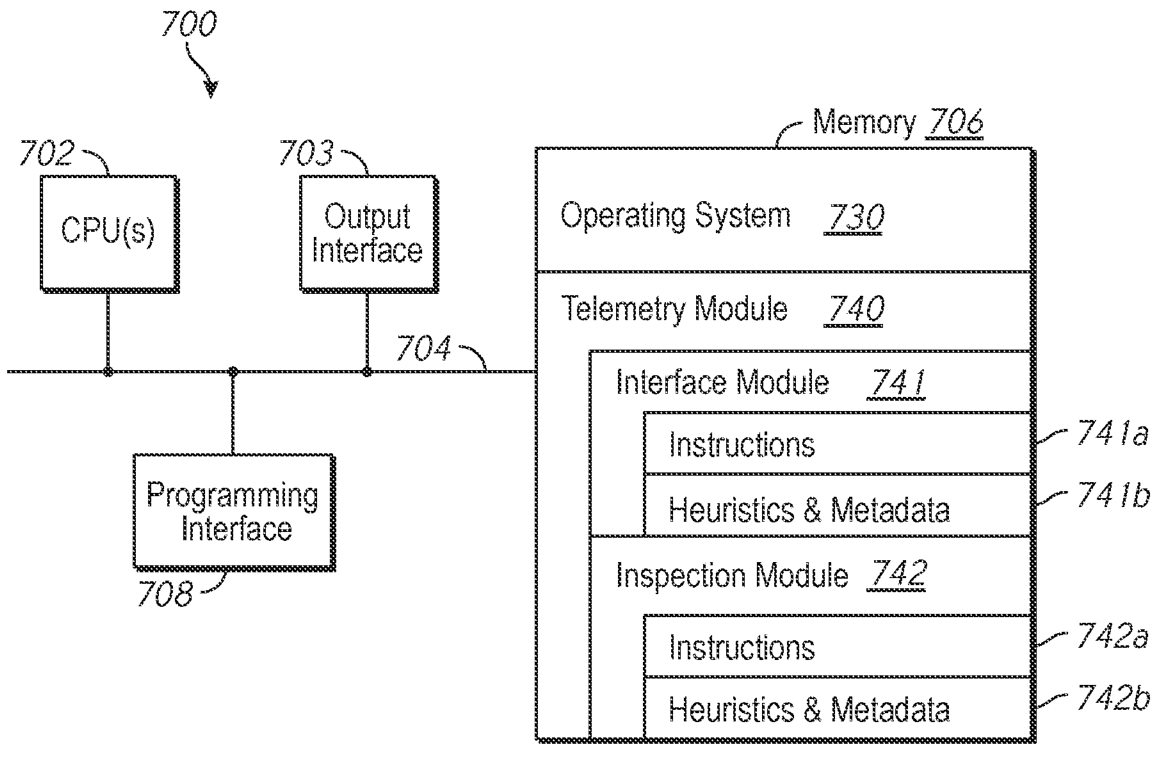
FIG. 7 is a block diagram of a computing device in accordance with some implementations.

FIG. 7 is a block diagram of a computing device 700 in accordance with some implementations. In some implementations, the computing device 700 corresponds to the switch 110*a* of FIG. 1 and performs one or more of the functionalities described above with respect to the switch 110*a*. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703 (e.g., a network interface), a memory 706, a programming interface 708, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730 and a telemetry module 740. In some implementations, one or more instructions are included in a combination of logic and non-transitory memory. The operating system 730 includes procedures for handling various basic system services and for performing hardware dependent tasks. In some implementations, the telemetry module 740 is configured to generate and transmit telemetry data. To that end, the telemetry module 740 includes an interface module 741 and an inspection module 742.

In some implementations, the interface module 741 is configured to receive a flow including a plurality of bytes, each byte having one of a plurality of byte values. To that end, the interface module 741 includes a set of instructions 741*a* and heuristics and metadata 741*b*. In some implementations, the inspection module 742 is configured to determine a byte value distribution metric based on a number of instances of each of the plurality of byte values in the flow. To that end, the inspection module 742 includes a set of instructions 742*a* and heuristics and metadata 742*b*. The inspection module can inspect the flow to generate telemetry data regarding the flow. In some implementations, the interface module 741 is further configured to transmit telemetry data regarding the flow, the telemetry data including the byte value distribution metric.

In some implementations, the interface module 741 is configured to receive a flow including a plurality of packets. To that end, the interface module 741 includes a set of instructions 741*a* and heuristics and metadata 741*b*. In some implementations, the inspection module 742 is configured to determine cryptographic protocol data regarding the flow. To that end, the inspection module 742 includes a set of instructions 742*a* and heuristics and metadata 742*b*. The inspection module can inspect the flow to generate telemetry data regarding the flow. In some implementations, the interface module 741 is further configured to transmit telemetry data regarding the flow, the telemetry data including cryptographic protocol data.

Although the telemetry module 740, the interface module 741, and the inspection module 742 are illustrated as residing on a single computing device 700, it should be understood that in other embodiments, any combination of the telemetry module 740, the interface module 741, and the inspection module 742 can reside in separate computing devices in various implementations. For example, in some implementations each of the telemetry module 740, the interface module 741, and the inspection module 742 reside on a separate computing device.

Figure 8:
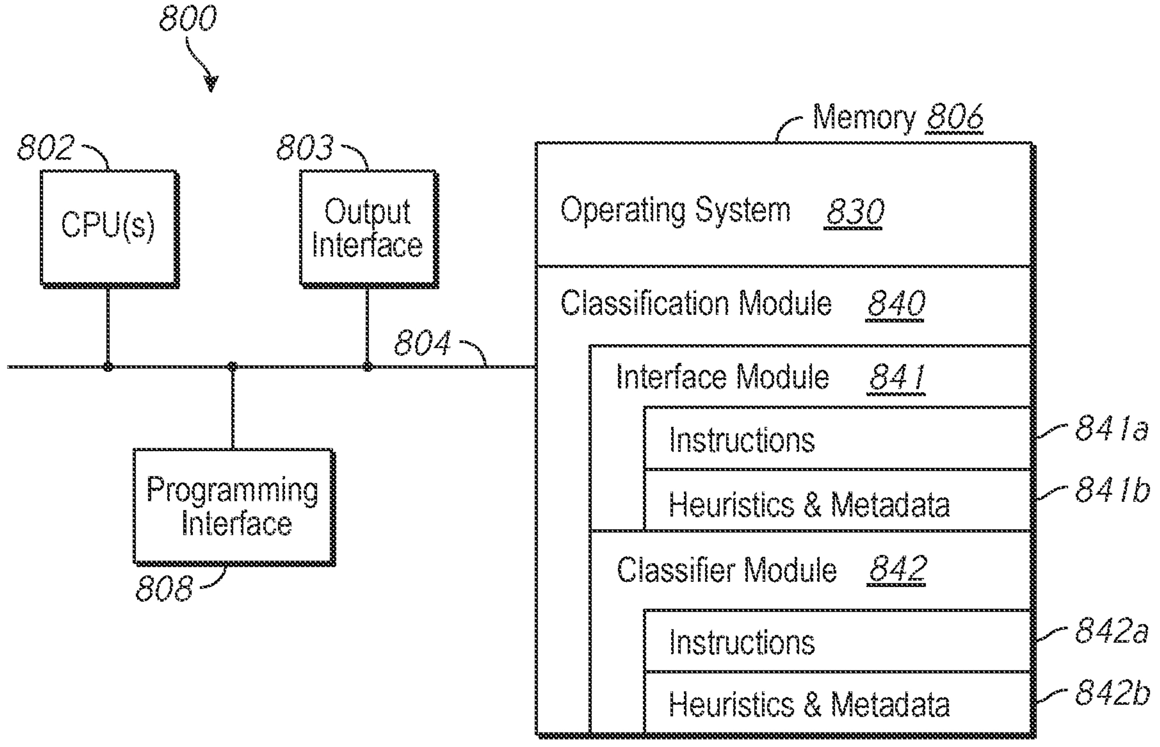
FIG. 8 is a block diagram of another computing device in accordance with some implementations.

FIG. 8 is a block diagram of a computing device 800 in accordance with some implementations. In some implementations, the computing device 800 corresponds to the telemetry backend system 120 of FIG. 1 and performs one or more of the functionalities described above with respect to the telemetry backend system 120. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803 (e.g., a network interface), a memory 806, a programming interface 808, and one or more communication buses 804 for interconnecting these and various other components.

In some implementations, the communication buses 804 include circuitry that interconnects and controls communications between system components. The memory 806 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some implementations, the memory 806 or the non-transitory computer readable storage medium of the memory 806 stores the following programs, modules and data structures, or a subset thereof including an optional operating system 830 and a classification module 840. In some implementations, one or more instructions are included in a combination of logic and non-transitory memory. The operating system 830 includes procedures for handling various basic system services and for performing hardware dependent tasks. In some implementations, the classification module 840 is configured to classify flows based on telemetry data regarding the flows. To that end, classification module 840 includes an interface module 841 and a classifier module 842.

In some implementations, the interface module 841 is configured to receive telemetry data regarding a flow, the telemetry data including a byte value distribution metric. To that end, the interface module 841 includes a set of instructions 841*a* and heuristics and metadata 841*b*. In some implementations, the classifier module 842 is configured to classify the flow based on the byte value distribution metric. To that end, the classifier module 842 includes a set of instructions 842*a* and heuristics and metadata 842*b*. The classifier module 842 can include, for example, a machine learning classifier.

In some implementations, the interface module 841 is configured to receive telemetry data regarding a flow, the telemetry data including cryptographic protocol data. To that end, the interface module 841 includes a set of instructions 841*a* and heuristics and metadata 841*b*. In some implementations, the classifier module 842 is configured to classify the flow based on the cryptographic protocol data. To that end, the classifier module 842 includes a set of instructions 842*a* and heuristics and metadata 842*b*. The classifier module 842 can include, for example, a machine learning classifier.

Although the classification module 840, the interface module 841, and the classifier module 842 are illustrated as residing on a single computing device 800, it should be understood that in other embodiments, any combination of the classification module 840, the interface module 841, and the classifier module 842 can reside in separate computing devices in various implementations. For example, in some implementations each of the classification module 840, the interface module 841, and the classifier module 842 reside on a separate computing device.

Moreover, FIGS. 7 and 8 are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIGS. 7 and 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

receiving, via a computer network, telemetry data of a traffic flow including a plurality of packets encrypted using a cryptographic protocol, the telemetry data including cryptographic protocol data that is unencrypted;

identifying multiple Transport Layer Security (TLS) features of the cryptographic protocol data, the multiple TLS features including two or more of: a TLS version number, one or more ciphersuites offered by a source device, a ciphersuite selected by a destination device, a TLS sequence of record lengths and times, a record type, a handshake type, an extension type, a size of a cryptographic key, a supported elliptical curve, or a supported point format;

performing, without decrypting individual ones of the plurality of packets, an analysis on the multiple TLS features using a machine learning model that has been trained with previously classified traffic data;

classifying a TLS implementation of the traffic flow based on the analysis, the TLS implementation being indicative of a cryptographic library implemented in communicating the traffic flow; and taking a remedial action with respect to the traffic flow based on the classifying of the TLS implementation of the traffic flow.

2. The method of claim 1, wherein the telemetry data of the traffic flow further includes at least one of: a source IP address of the traffic flow, a destination IP address of the traffic flow, a start time of the traffic flow, a stop time of the traffic flow, a protocol associated with the traffic flow, a number of bytes of the traffic flow, or a number of the plurality of packets.

3. The method of claim 1, wherein the telemetry data of the traffic flow further includes at least one of: a sequence of packet lengths and times (SRLT) for one or more of the plurality of packets or a byte value distribution metric.

4. The method of claim 1, further comprising:

classifying a source device of the traffic flow, wherein the classifying of the TLS implementation of the traffic flow is based further on classification of the source device of the traffic flow.

5. The method of claim 1, wherein the method is performed by a gateway label edge router.

6. The method of claim 1, wherein the remedial action includes initiating an upgrade of the source device of the traffic flow.

7. The method of claim 1, further comprising:

determining a byte value distribution metric based on a number of instances of each of a plurality of byte values in the traffic flow; and classifying the traffic flow as at least one of a benign flow, a malicious flow, a tunneled flow, or a direct flow based on the byte value distribution metric.

8. The method of claim 1, wherein the taking of the remedial action with respect to the traffic flow comprises:

performing one or more remedial actions, wherein the one or more remedial actions are selected from a group consisting of: generating an alert, stopping the traffic flow, quarantining a source device of the traffic flow, and initiating an upgrade of the source device of the traffic flow.

9. The method of claim 1, further comprising:

identifying a device associated with the traffic flow using an insecure TLS configuration based on the cryptographic protocol data of the traffic flow.

10. An apparatus, comprising:

one or more network interfaces;

a processor coupled to the one or more network interfaces; and a memory configured to store one or more instructions, that when executed by the processor, configure the processor to:

receive, via a computer network, telemetry data of a traffic flow including a plurality of packets encrypted using a cryptographic protocol, the telemetry data including cryptographic protocol data that is unencrypted;

identify multiple Transport Layer Security (TLS) features of the cryptographic protocol data, the multiple TLS features including two or more of; a TLS version number, one or more ciphersuites offered by a source device, a ciphersuite selected by a destination device, a TLS sequence of record lengths and times, a record type, a handshake type, an extension type, a size of a cryptographic key, a supported elliptical curve, or a supported point format;

perform, without decrypting individual ones of the plurality of packets, an analysis on the multiple TLS features using a machine learning model that has been trained with previously classified traffic data;

classify a TLS implementation of the traffic flow based on the analysis, the TLS implementation being indicative of a cryptographic library implemented in communicating the traffic flow; and take a remedial action with respect to the traffic flow based on the classifying of the TLS implementation of the traffic flow.

11. The apparatus of claim 10, wherein the telemetry data of the traffic flow further includes at least one of: a source IP address of the traffic flow, a destination IP address of the traffic flow, a start time of the traffic flow, a stop time of the traffic flow, a protocol associated with the traffic flow, a number of bytes of the traffic flow, and a number of the plurality of packets.

12. The apparatus of claim 10, wherein the telemetry data of the traffic flow further includes at least one of: a sequence of packet lengths and times (SRLT) for one or more of the plurality of packets and a byte value distribution metric.

13. The apparatus of claim 10, wherein the one or more instructions further configure the processor to:

classify the traffic flow as either a malicious flow or benign flow based on the cryptographic protocol data of the traffic flow.

14. The apparatus of claim 10, wherein the one or more instructions further configure the processor to:

classify the traffic flow as either a tunneled flow or non-tunneled flow based on the cryptographic protocol data of the traffic flow.

15. The apparatus of claim 10, wherein the one or more instructions further configure the processor to:

classify a source device of the traffic flow, wherein the classifying of the TLS implement of the traffic flow is based further on classification of the source device of the traffic flow.

16. The apparatus of claim 10, wherein the cryptographic library is a cryptographic library of the source device of the traffic flow.

17. The apparatus of claim 10, wherein the cryptographic library is a cryptographic library of the destination device of the traffic flow.

18. The apparatus of claim 10, wherein the processor is configured to take the remedial action by:

performing one or more remedial actions, wherein the one or more remedial actions are selected from a group consisting of: generating an alert, stopping the traffic flow, quarantining a source device of the traffic flow, and initiating an upgrade of the source device of the traffic flow.

19. A tangible, non-transitory, computer-readable medium that stores program instructions causing a gateway label edge router to execute a process comprising:

receiving, via a computer network, telemetry data of a traffic flow including a plurality of packets encrypted using a cryptographic protocol, the telemetry data of the traffic flow including cryptographic protocol data that is unencrypted;

identifying multiple Transport Layer Security (TLS) features of the cryptographic protocol data, the multiple TLS features including two or more of: a TLS version number, one or more ciphersuites offered by a source device, a ciphersuite selected by a destination device, a TLS sequence of record lengths and times, a record type, a handshake type, an extension type, a size of a cryptographic key, a supported elliptical curve, or a supported point format;

performing, without decrypting individual ones of the plurality of packets, an analysis on the multiple TLS features using a machine learning model that has been trained with previously classified traffic data;

classifying a TLS implementation of the traffic flow based on the analysis, the TLS implementation being indicative of a cryptographic library implemented in communicating the traffic flow; and taking a remedial action with respect to the traffic flow based on the classifying of the TLS implementation of the traffic flow.

20. The apparatus of claim 10, wherein the one or more instructions further configure the processor to:

determine a byte value distribution metric based on a number of instances of each of a plurality of byte values in the traffic flow; and classify the traffic flow as at least one of a benign flow, a malicious flow, a tunneled flow, or a direct flow based on the byte value distribution metric.

* * * * *